United States Patent Office 3,501,518
Patented Mar. 17, 1970

3,501,518
PRODUCTION OF CARBOXYLIC ACIDS OR CARBOXYLIC ESTERS
Nikolaus von Kutepow, Karlsruhe, and Knut Bittler and Dieter Neubauer, Ludwigshafen (Rhine), Germany, assignors to Badische Anilin- & Soda-Fabrik Aktiengesellschaft, Ludwigshafen (Rhine), Germany
No Drawing. Filed Dec. 14, 1965, Ser. No. 513,848
Claims priority, application Germany, Dec. 19, 1964, B 79,815
Int. Cl. C07c *69/28, 69/24*
U.S. Cl. 260—468                 8 Claims

ABSTRACT OF THE DISCLOSURE

Process for the production of carboxylic acids or carboxylic esters by reacting an exclusively olefinically unsaturated hydrocarbon of 2 to 20 carbon atoms and 1 to 4 olefinic double bonds with carbon monoxide and water or an alcohol or phenol of 1 to 20 carbon atoms and 1 or 2 hydroxyl groups at a temperature of 30–180° C. and a pressure of 25–1000 atmospheres in the presence of metallic palladium or a palladium chalcogenide, a strong or medium strength acid (dissociation constant $K > 10^{-4}$) and an organic phosphine or nitrile. The products of this process are known, e.g. ethylene when reacted with carbon monoxide and water yields propionic acid.

---

This invention relates to a process for the production of carboxylic acids or carboxylic esters by carbonylation of olefinically unsaturated compounds.

It is known that olefins, carbon monoxide and water or alcohols or phenols can be reacted at elevated temperature and superatmospheric pressure to form carboxylic acids or carboxylic esters. The catalysts used in these so-called carbonylation reactions are generally compounds of metals of the iron group of the Periodic System of Elements which are capable of forming carbonyls. It is also possible, however, to start from the metals themselves or from the metal carbonyls. The reaction takes place in the presence of free or combined halogen as an activator and under relatively drastic conditions, so that it is not possible to react sensitive olefins.

It is also known that olefins may be reacted with carbon monoxide and alcohols to form carboxylic esters by using palladium chloride or palladium metal as catalyst. This reaction is optionally carried out with an addition of hydrogen chloride (see Tetrahedron Letters No. 22 (1963), 1437–1440; Tetrahedron Letters No. 26 (1963), 1811–1813; Tetrahedron Letters No. 12 (1964), 605–608). Obviously only carboxylic esters can be prepared by this method, and not the free acids. Owing to the relatively drastic reaction conditions, secondary reactions occur to a considerable extent. Thus adding on of hydrogen chloride to the olefinic double bond is observed.

Hydrogenations also occur. When starting from olefins containing chloride, reaction products of a different type are obtained in appreciable quantities by elimination of hydrogen chloride followed by hydrogenation. Even monounsaturated cycloaliphatic olefins, such as cyclohexene, tend to undergo secondary reactions to such an extent that they cannot be converted to the corresponding carboxylic esters in good yields.

According to another prior art method, carboxylic esters are obtained from the same starting materials in the presence of a catalyst which consists of an alcohol-soluble tin salt or germanium salt and an alcohol-soluble salt of a precious metal of Group VIII of the Periodic System. Temperatures of 50° to 320° C. and pressures of 100 to 3,000 atmospheres are used in this method.

Another method for the production of carboxylic acids or carboxylic esters, as disclosed in our copending application, Ser. No. 388,266, filed Aug. 7, 1964, consists in the reaction of olefinically unsaturated compounds with carbon monoxide and water or an alcohol or phenol in the presence of a palladium catalyst having the formula $_mLPdX_n$ in which L denotes an organic phosphine, ammonia or an amine, a nitrile or an unsaturated hydrocarbon, X denotes a monovalent radical or an organic or inorganic acid, while $m$ denotes 1 or 2, $n$ denotes 1 or 2 and the sum of $m+n$ is equal to 3 or 4. The process is carried out at 20° to 250° C., particularly 30° to 170° C., and a pressure of 25 to 1,000 atmospheres, preferably 75 to 1,000 atmospheres, is used. Preferred olefinically unsaturated compounds are hydrocarbons having two to twenty carbon atoms and one to four double bonds. They may have an acetylene bond in conjugation to a double bond and may also contain an aromatic structure. Preferred alcohols are alkanols, alkanediols, cycloalkanols and aralkanols having up to twenty carbon atoms. Preferred phenols are those having six to ten carbon atoms and one to two hydroxyl groups. The best results are achieved with catalysts in which L denotes an organic phosphine.

It is an object of this invention to provide a process according to which olefinically unsaturated compounds can be reacted under mild conditions to form carboxylic acids or carboxylic esters. It is another object of this invention to provide a process according to which it is not necessary to use germanium salts or tin salts in addition to precious metal compounds. It is yet another object of this invention to provide a process according to which simpler palladium catalysts are used than in the methods using palladium compounds having the above-mentioned formula $L_mPdX_n$. Other objects and advantages of the process of the invention will be apparent from the following description.

We have now found that carboxylic acids or carboxylic esters are advantageously obtained by reaction of mono- or polyolefinically unsaturated compounds with carbon monoxide and water or alcohols are phenols in the presence of palladium catalysts at elevated temperature and advantageously under superatmospheric pressure, by using as the catalyst: palladium metal or a palladium chalcogenide (if desired on a carrier) together with an acid and an organic phosphine and/or a nitrile.

The new process operates under milder conditions than the prior art methods, so that secondary reactions are substantially suppressed. Sensitive unsaturated cycloaliphatic compounds and particularly polyolefinically unsaturated cycloaliphatic hydrocarbons may be reacted with good results according to the new process, and the polyolefinically unsaturated compounds may be slectively carbonylated by choosing the appropriate reaction conditions, i.e. monobasic, dibasicor polybasic carboxylic acids or their esters may be prepared.

Preferred starting materials for the process according to this invention are compounds having exclusively olefinic unsaturation and having one to four double bonds and two to twenty carbon atoms. They may have hydrocarbon structure without acetylenic bonds, possibly with the inclusion of aromatic nuclei, or may contain additional groups or atoms, which are inert under the reaction conditions, i.e. do not interfere with the reaction. Examples of such substituents are carboxylic groups or carboxylic ester groups, and also halogen atoms and ether bridges. The following may be mentioned by way of example as suitable olefinically unsaturated compounds: ethylene, vinyl chloride, propene, butene-(2), hexene-(3), dodecene-(1), 2-ethylhexene-(1), propenylbenzene, cyclohexene, vinyl cyclohexene-(3), cyclooctene, cyclododecene, butadiene-(1,3), isoprene, piperylene, cyclooctadiene-(1,5), octatriene-(2,4,6), methylheptatriene, cyclododecatriene - (1,5,9), 1 - chlorocyclododecadiene - (5,9), ethyl acrylate, acrylonitrile, acrylamide, N,N-dimethylmethacrylamide, oleic acid, ricinoleic acid, undecylenic acid, methyl allyl ether, cyclohexadieneces and acrolein.

Pure carbon monoxide may be used. It is also possible however to react a commercial gas containing for example up to 30% by volume of inert constituents, such as saturated hydrocarbons or nitrogen.

The alcohols may belong to the aliphatic, cycloaliphatic or araliphatic series. Like the phenols, they may have hydrocarbon structure apart from the hydroxyl groups, or may bear additional substitutes which are inert under the reaction conditions. The substituents specified for the olefinically unsaturated starting materials are suitable for this purpose. Preferred alcohols or phenols have one to two hydroxyl groups, up to twenty carbon atoms and, apart from hydroxyl groups hydrocarbon structure without olefinic or acetylenic bonds. The reaction proceeds best with monohydric alcohols. If polyhydric alcohols or phenols are reacted, the formation of products which have been esterified one or more times may be favored by appropriate choice of the proportions. The following may be given as examples of suitable alcohols and phenols: methanol, ethanol, propanol, stearyl alcohol, isobutyl alcohol, tertiary-butyl alcohol, benzyl alcohol, β-phenylethyl alcohol, cyclohexanol, cyclooctanol, methyl glycol, ε-chlorocaprylic alcohol, ε-hydroxycaproic acid, oleyl alcohol, ethylene glycol, hexanediol-(1,6), butanetriol-(1,2,4), phenol, o-cresol, α-naphthol and hydroquinone.

As a rule the carbon monoxide and/or the water, alcohol or phenol is used in an excess over the olefinically unsaturated compound. For example 1 to 10 equivalents of the said hydroxyl compounds may be used per double bond.

An essential component of the catalysts of the process according to the invention is palladium or a palladium chalcogenide. Palladium is preferably used in finely divided form, for example as palladium black, palladium sponge or palladium granules. Palladium oxide and palladium sulfide are preferred among the palladium chalcogenides. Both palladium and palladium chalcogenides may be applied to inert carriers. Examples of suitable carriers are asbestos, active carbon, bentonite, aluminue oxide, silica gel and barium sulfate. The palladium or palladium chalcogenide is applied to the carrier by conventional methods. The content of palladium or palladium chalcogenide (with reference to the carrier) is in general from 0.001 to 50% by weight.

A second important feature of the process according to the invention is that the reaction is carried out in an acid medium, i.e. in the presence of an acid. It is preferable to use strong or medium strength acids, preferably inorganic acids, such as sulfuric acid, phosphoric acid and perchloric acid. Particularly good results are obtained with hydrogen halides, particularly with hydrogen chloride, hydrogen bromide and hydrogen iodide. The acids may be used as such or in the form of solutions, preferably aqueous, aqueous-alcoholic or alcoholic solutions.

A third essential component of the catalyst is an organic phosphine or nitrile. The substance used may contain once or more than once, preferably up to three times, the characteristic group which is essential for it to be classified in one of the said classes of substances. Apart from the said group, the substances may either have hydrocarbon structure or contain additional inert groups or atoms such as have been mentioned above in relation to the olefinically unsaturated starting materials. Preferred phosphines are tertiary phosphines containing at least one aromatic radical, particularly triarylphosphines, but also tricycloalkylphosphines, in each case having eighteen to thirty carbon atoms. Trialylphosphines, particularly those having three to thirty carbon atoms, are also suitable. Preferred nitriles have two to twenty carbon atoms, one to two nitrile groups and, apart from these groups, saturated hydrocarbon structure, possibly including aromatic nuclei. The following are examples of suitable phosphines or nitriles: acetonitrile, caprionitrile, benzonitrile, benzyl cyanide, adipodinitrile, o-phthalodinitrile, triphenylphosphine, tri-o-tolylphosphine, tri - p - methoxyphenylphosphine, phenyl-dibutylphosphine, diphenylmethylphosphine, tricyclohexylphosphine, tri-n-butylphosphine, tri-n-octyl-(1)-phosphine. It is also possible to use mixtures of the said substances.

The amounts in which the said catalyst components are used may be varied within wide limits. The palladium or palladium chalcogenides are in general used in amounts of 0.001 to 5% by weight on the total olefinically unsaturated compound. The acid is advantageously used in amounts of 0.05 to 40%, particularly 1 to 7%, by weight on the water, alcohol and/or phenol. The phosphine or nitrile is advantageously used in amounts of from 0.005 to 10%, particularly 0.05 to 5%, by weight on the olefinically unsaturated compound.

The process according to the invention may be carried out in the absence of solvents. It is also possible however to coemploy an inert organic solvent. This is particularly advisable when the reaction mixture would otherwise form two liquid phases. Examples of suitable inert solvents are ethers, such as dioxane and tetrahydrofuran; aliphatic and aromatic hydrocarbons, such as pentane, gasoline fractions, cyclohexane, benzene and toluene; and chlorohydrocarbons, such as methylene chloride and p-dichlorobenzene. The reaction products may also serve as solvents. The solvent may be used in amounts of 20 to 500% by weight on the olefinically unsaturated compound.

The process according to the invention is advantageously carried out at a temperature of from 30° to 180° C. A preferred temperature range lies between 50° and 150° C. The process according to the invention may be carried out at atmospheric pressure. However, in order to obtain a high reaction velocity it is advantageous to use superatmospheric pressure. Pressures of from 25 to 1,000 atmospheres are used in general. Higher pressures are possible but do not bring any particular advantage.

The process according to the invention may be carried out batchwise or continuously. In continuous operation, use may be made of the trickling method in which the liquid reactants and the carbon monoxide are passed over a rigidly arranged catalyst either cocurrently or countercurrently. Unreacted carbon monoxide is recycled by means of a circulation pump. In another embodiment of the process, the catalyst is rigidly arranged in a reactor, the liquid reactants together with the carbon monoxide are supplied to the bottom of the reactor and the reaction product is withdrawn at the top of the reactor. Unreacted carbon monoxide is also recycled in this case to the reactor after fresh carbon monoxide has been added to it. It is also possible to supply the liquid reactants to the top of a reactor and the gas to the bottom, the stationary catalyst being always covered by the liquid phase. The reaction product is withdrawn at the bottom of the reactor. Unreacted carbon monoxide is recycled, as before.

The invention is further illustrated by the following examples.

The parts specified in the examples are by weight, unless otherwise stated. Parts by weight bear the same relation to parts by volume as the g to the ccm.

Example 1

A glass insert is charged with 1 part of a catalyst consisting of 5% by weight of palladium metal on carbon, 120 parts of cyclododecatriene-(1,5,9), 45 parts by volume of ethanol containing hydrogen chloride and having an acid number of 50, and 0.5 part of triphenylphosphine, and the glass insert is fitted into an autoclave of corrosion-resistant steel provided for the purpose. The autoclave is closed, flushed out with nitrogen and then 300 atmospheres gauge of carbon monoxide is forced in. The autoclave is then rotated and heated to 100° C. As soon as this temperature has been reached, carbon monoxide is forced in to a pressure of 700 atmospheres gauge and this pressure is maintained for eight hours. The autoclave is then cooled to room temperature, released from pressure and emptied. 162 parts of crude reaction mixture is obtained. The catalyst is filtered off and the filtrate (155 parts) is distilled. 7 parts of alcohol passes over at 78° C. The fraction which passes over at 55° to 78° C. at 0.1 mm. Hg amounts to 57 parts and consists of unreacted cyclododecatriene-(1,5,9). Then at 97° C. and 0.15 mm. Hg, 72 parts of cyclododecadiene-(5,9)-carboxylic-(1)-ethyl ester having a refractive index $n_D^{20}=1.4901$, and at 130° C. and 0.15 mm. Hg, 12 parts of cyclododecene-(9)-dicarboxylic-(1,5)-diethyl ester pass over. 5 parts of higher boiling point residue remains.

By following the procedure described but omitting the triphenylphosphine, the crude reaction mixture is 155 parts. It is filtered free from catalyst and the filtrate (153 parts) is distilled. Besides 29 parts of alcohol, there are obtained at 50° C. and 0.25 mm. Hg 112 parts of cyclododecatriene-(1,5,9) and only 8 parts of cyclododecadiene-(5,9)-carboxylic-(1)-ethyl ester. 5 parts of higher boiling point residue remains in the distillation flask.

By following the same procedure but omitting the hydrogen chloride, 145 parts of reaction mixture is obtained which is filtered and distilled. In addition to 4 parts of residue, there are merely obtained 19 parts of alcohol and 108 parts of cyclododecatriene-(1,5,9).

Example 2

10 parts of supported catalyst (0.5% by weight of PdO on aluminum oxide), 120 parts of cyclododecatriene-(1,5,9), 45 parts by volume of ethanol containing hydrogen chloride gas and having an acid number of 50, and 0.5 part of triphenylphosphine are reacted with carbon monoxide as in Example 1 but at 120° C. After the pressure has been released, 155 parts of reaction mixture is obtained. It is decanted off from the supported catalyst and distilled. The following fractions are obtained:

| Parts | Boiling point (mm. Hg) | Substance |
|---|---|---|
| 2 | 78° C | Alcohol. |
| 29 | 60° C./0.2 | Cyclododecatriene-(1, 5, 9). |
| 77 | 90° C./0.15 | Cyclododecadiene-(5, 9)-carboxylic-(1)-ethyl ester; $n_D^{20}=1.4900$. |
| 23 | 120° C./0.15 | Cyclododecene-(9)-dicarboxylic-(1, 5)-diethyl ester. |
| 15 [1] | | |

[1] Parts residue.

The supported catalyst, which has been freed from crude reaction mixture by decantation, may be used for a fresh batch.

When the procedure described is followed but without adding triphenylphosphine, 144 parts of reaction mixture is obtained from which 132 parts are distilled. In addition to 14 parts of alcohol and 103 parts of cyclododecatriene-(1,5,9) there is obtained 5 parts having a boiling point of 100° C./0.3 mm. Hg which, according to its refractive index of $n_D^{20}=1.4977$, consists only to the extent of about 50% of cyclododecadiene-(5,9)-carboxylic-(1)-ethyl ester (cyclododecatriene $n_D^{20}=1.5080$;

cyclododecadiene-(5,9)-carboxylic-(1)-ethyl ester $n_D^{20}=1.4900$)

5 parts of residue remain.

Example 3

10 parts of a supported catalyst consisting of 0.07% by weight of palladium on silica gel, 120 parts of cyclo dodecatriene-(1,5,9), 45 parts by volume of ethanol containing hydrogen chloride and having an acid number of 50, and 0.5 part of triphenylphosphine are reacted with carbon monoxide at 140° C. as described in Example 1. The catalyst is filtered off and 155 parts of crude reaction mixture is obtained which is distilled, first at atmospheric pressure to remove the alcohol and then in vacuo. 7 parts of alcohol, 59 parts of cyclodecatriene-(1,5,9) and 73 parts of cyclododecadiene-(5,9)-carboxylic-(1)-ethyl ester having a boiling point of 90° C. at 0.1 mm. Hg; $n_D^{20}=1.4900$ are obtained. At 120° C. at 0.1 mm. Hg, 5 parts of cyclododecene-(9)-dicarboxylic-(1,5)-diethyl ester passes over. 7 parts of residue remain.

Example 4

89.5 parts of wide-pored well-dried silica gel is soaked well with a solution of 8.34 parts of palladium chloride and 5.5 parts of sodium chloride in a little water. The whole of the liquid is taken up by the silica gel. The catalyst is dried for twelve hours at 100° C. and then reduced at 300° C. in a stream of hydrogen for three hours. Analysis gives 4.2% by weight of palladium.

1 part of this supported catalyst, 120 parts of cyclododecatriene-(1,5,9), 45 parts by volume of ethanol containing hydrogen chloride and having the acid number 40 and 0.5 part of triphenylphosphine are reacted in a glass insert as described in Example 1 at 300 atmospheres gauge pressure of carbon monoxide and 100° C. The crude reaction mixture is filtered off from the supported catalyst. The supported catalyst may be used again. The following substances are obtained by distillation of the filtrate (166 parts):

| Parts | Boiling point (mm. Hg) | Substance |
|---|---|---|
| 4 | 78° C | Alcohol. |
| 40 | 53° C. (0.3) | Cyclododecatriene-(1, 5, 9). |
| 87 | 95° C. (0.2) | Cyclododecadiene-(5, 9)-carboxylic-(1)-ethyl ester; $n_D^{20}=1.4898$. |
| 23 | 120° to 150° C. (0.2). | About 50% of cyclododecadiene-(5, 9)-carboxylic-(1)-ethyl ester and 50% of cyclododecene-(9)-dicarboxylic-(1, 5)-diethyl ester; $n_D^{20}=1.4847$. |
| 4 [1] | | |

[1] Parts residue.

Example 5

1 part of supported catalyst according to Example 4, 120 parts of cyclododecatriene-(1,5,9), 45 parts by volume of ethanol containing hydrogen chloride and having an acid number of 5, and 0.5 part of triphenylphosphine are placed in a glass insert and reacted with carbon monoxide at 120° C. in an autoclave as in Example 1 (initial pressure 150 atmospheres gauge, later 300 atmospheres gauge). The reaction mixture is 155 parts. It is decanted off from the catalyst and the liquid phase (153 parts) is distilled. 18 parts of alcohol are first obtained. Further distillation in vacuo yields 84 parts of cyclododecatriene-(1,5,9) at 52° to 90° C. at 0.2 mm. Hg and 41 parts of cyclododecadiene-(5,9)-carboxylic-(1)-ethyl ester at 90° to 115° C. at 0.1 mm. Hg ($n_D^{20}=1.4905$). 4 parts of residue remain.

Example 6

0.1 part of 30% by weight palladium asbestos, 0.2 part of triphenylphosphine, 130 parts of cyclododecatriene-(1,5,9) and 40 parts by volume of ethanolic hydrochloric acid having an acid number of 104 are placed in an autoclave having a glass insert. The autoclave is flushed out with nitrogen and then 200 atmospheres of carbon monoxide is forced in and the rotating autoclave is heated to 110° C. Carbon monoxide is forced in up to 300 atmospheres and the temperature and pressure are maintained for four hours. With a gas absorption of 20 atmospheres, 178 parts of crude reaction mixture is obtained which is washed with calcium chloride solution and sodium carbonate solution, dried with solid calcium chloride and then fractionated over an efficient column at 0.2 mm. Hg 58 parts of cyclododecadiene-(5,9)-carboxylic-(1)-ethyl ester and 18 parts of cyclododecene-(9)-dicarboxylic-(1,5)-diethyl ester are obtained in addition to 55 parts of unreacted cyclododecatriene-(1,5,9).

Example 7

1 part of supported catalyst (5% of palladium on silica gel), 1 part of triphenylphosphine and 50 parts of 12% aqueous hydrochloric acid are placed in an autoclave of corrosion-resistant material having a capacity of 800 parts by volume. The autoclave is flushed out with nitrogen and then closed. 300 atmospheres gauge of a mixture of equal parts of ethylene and carbon monoxide is then forced in cold, the autoclave is set in rotation and heated to 140° C. After this temperature has been reached, more of the same gas mixture is forced in up to 700 atmospheres gauge and this pressure is maintained by continuously forcing in more of the gas mixture. When there is no further fall in pressure, the autoclave is left at 700 atmospheres gauge pressure for another two hours. The total gas absorption is 690 atmospheres gauge and the amount of crude reaction mixture is 200 parts. This is distilled, 122 parts of pure propionic acid is obtained having a boiling point of 138° to 141° C. ($n_D^{20}$=1.3882).

By following the above procedure but without adding triphenylphosphine, the gas absorption is only 40 atmospheres gauge and the crude reaction mixture is 69 parts. This is distilled and gives only 54 parts of distillate having a boiling point of 100° to 108° C. and 12 parts of a viscous residue. Propionic acid is not obtained.

Example 8

1 part of supported catalyst (5% of palladium on silica gel), 1 part of triphenyl phosphine and 50 parts of 9% aqueous hydrochloric acid are placed in an autoclave having a capacity of 800 parts by volume and a glass insert. The procedure described in Example 7 is then followed. The pressure drop is 550 atmospheres gauge and the amount of crude reaction mixture is 199 parts. 145 parts of propionic acid having a boiling point of 136° to 141° C. is obtained ($n_D^{20}$=1.3874).

If the same procedure be followed but without adding triphenylphosphine, the pressure drop is 30 atmospheres gauge, the amount of crude reaction mixture is 58 parts. A fraction of 48 parts having a boiling point 98° to 108° C. consisting mainly of water is obtained and also 5 parts of viscous residue. Propionic acid is not formed.

Example 9

1 part of supported catalyst (5% of palladium on silica gel), 1 part of triphenylphosphine and 50 parts of 7.2% aqueous hydrochloric acid are placed in an autoclave having a capacity of 800 parts by volume and a glass insert. The autoclave is flushed with nitrogen and closed; 300 atmospheres gauge of a mixture of equal parts of ethylene and carbon monoxide is forced in cold. The autoclave is set in rotation and heated to 140° C. After this temperature has been reached, carbon monoxide is forced in up to 700 atmospheres gauge and this pressure is maintained by forcing in carbon monoxide until there is no further drop in pressure. The total pressure drop is 290 atmospheres gauge and the amount of crude reaction mixture is 124 parts. This gives, when distilled, 60 parts of propionic acid having a boiling point of 138° to 141° C.; $n_D^{20}$=1.3865.

Example 10

1 part of supported catalyst (5% palladium on silica gel), 1 part of triphenylphosphine, 20 parts of 9% aqueous hydrochloric acid and 110 parts of cyclooctene are placed in an autoclave of corrosion-resistant material having a glass insert. 300 atmospheres gauge of carbon monoxide is forced in cold, the autoclave is set in rotation and heated to 130° C. After this temperature has been reached, carbon monoxide is forced in to a pressure of 700 atmospheres gauge and this pressure is maintained by continuous supply of carbon monoxide until no further decrease in pressure takes place. 110 atmospheres gauge of carbon monoxide is thus absorbed. The crude reaction product amounts to 143 parts of which 138 parts is distilled off. 110 parts of cyclooctene carboxylic acid having a boiling point of 93° to 101° C. at 0.2 mm. Hg is obtained (iodine number 0, acid number 355).

By following the procedure described but without adding triphenylphosphine, the drop in pressure is 10 atmospheres gauge, the crude reaction product amounts to 122 parts in which there is no cyclooctane carboxylic acid.

Example 11

1 part of the supported catalyst used in Example 10, 1 part of triphenylphosphine, 81 parts of cyclooctadiene-(1,5) and 40 parts of 9% aqueous hydrochloric acid are reacted with carbon monoxide at 140° C. as described in Example 10. 80 atmospheres gauge of carbon monoxide is absorbed and the solid reaction product weighs 81 parts. The crude reaction product is taken up in ether, boiled with animal charcoal, filtered and cyclooctane dicarboxylic acid is precipitated from the filtrate with petroleum ether. The cyclooctane dicarboxylic acid, which is still liquid, is freed from adherent ether at 70° C. in the vacuum of a water jet pump and slowly solidifies on cooling. 68 parts of cyclooctane dicarboxylic acid is thus obtained.

Example 12

1 part of supported catalyst (5% of palladium on silica gel), 0.5 part of triphenylphosphine, 81 parts of cyclooctadiene-(1,5) and 20 parts of 9% aqueous hydrochloric acid are reacted with carbon monoxide at 120° to 125° C. as described in Example 10. Absorption of carbon monoxide is 60 atmospheres gauge and the two-phase reaction product amounts to 106 parts. This is distilled, water first being removed at atmospheric pressure. The remainder is fractionated in vacuo. 37.5 parts of cyclooctene-(4)-carboxylic acid-(1) having a boiling point of 92° to 104° C. at 0.3 mm. Hg is obtained.

Example 13

An autoclave of corrosion resistant material is charged with 2 parts of 20% of palladium on active carbon, 2 parts of triphenylphosphine, 120 parts commercial diisobutylene and 80 parts of ethanolic hydrochloric acid having an acid number of 100, the autoclave is closed, carefully flushed with nitrogen and 200 atmospheres of carbon monoxide is forced in. The rotating autoclave is heated to 140° C. and carbon monoxide is then forced in up to a total pressure of 300 atmospheres. The pressure and temperature are maintained for six hours, a total gas absorption of 10 atmospheres being observed. The autoclave is cooled and released from pressure. 194 parts of reaction product is obtained and is fractionated over an efficient column at 13 mm. Hg. At this pressure, 38 parts of a mixture of isomeric octane carboxylic ethyl esters ($n_D^{20}$=1.4190) passes over at from 70° to 81° C.

*Analysis.*—Calculated (percent): C, 71.0; H, 11.8; O, 17.2, molecular weight 186. Found (percent): C, 71.0; H, 12.1; O, 17.0, molecular weight 193.

If the same experiment be carried out without adding triphenylphosphine, there is no absorption of gas. The crude reaction product (189 parts) collects in the cooled trap when distilled; no ester fractions is obtained, but only 2 parts of residue.

Example 14

2 parts of triphenylphosphine, 2 parts of a supported catalyst (20% of palladium on animal charcoal), 100 parts of styrene and 50 parts of 9% aqueous hydrochloric acid are charged into an autoclave. The procedure as described in Example 13 is followed but 120° C. is chosen as the reaction temperature and the reaction product is treated with sodium carbonate solution. The filtered sodium carbonate extract is washed with petroleum ether and acidified with sulfuric acid. 21.3 parts of crude phenylpropionic acid (acid number 270, calculated 274) separates above the acidified solution.

*Analysis.*—Calculated (percent): C, 72.0; H, 6.7, O, 21.9. Found (percent): C, 71.1; H, 7.0; O, 22.3.

If the experiment be repeated without adding triphenylphosphine, only polymerized styrene is obtained from whose sodium carbonate extract no phenylpropionic acid is deposited on acidification.

Example 15

0.2 part of a supported catalyst (20% of palladium on animal charcoal), 0.2 part of triphenylphosphine and 50 parts of 6% aqueous hydrochloric acid are placed in an autoclave which is then closed, rinsed out with nitrogen and 140 parts of butadiene forced in. 300 atmospheres of carbon monoxide is then forced in and the rotating autoclave is heated to 130° C. After this temperature has been reached, carbon monoxide is forced in up to 700 atmospheres and the pressure and temperature are kept constant for six hours. A total gas absorption of 100 atmospheres is observed and the amount of reaction product is 136 parts; it is extracted with sodium carbonate solution. The sodium carbonate extract is filtered, shaken with petroleum ether and then acidified with sulfuric acid. 29 parts of butene-(2)-carboxylic acid-(1) separates. A sample distilled in a water jet vacuum gives the following analysis:

|  | Found | Calculated |
|---|---|---|
| Content of carbon, percent | 60.1 | 60.0 |
| Content of hydrogen, percent | 8.3 | 8.0 |
| Content of oxygen, percent | 31.7 | 32.0 |
| Content of chlorine, percent | <0.5 | 0 |
| Hydrogenation iodine number | 247 | 254 |
| Acid number | 530 | 560 |

If the experiment be repeated without adding triphenylphosphine the total gas absorption is 90 atmospheres and 117 parts of reaction product is obtained which is partly polymerized. No butene-(2)-carboxylic acid-(1) separates when the sodium carbonate extract is acidified.

Example 16

The procedure of Example 15 is followed but 1 part of supported catalyst (20% of palladium on animal charcoal) and 1 part of triphenylphosphine are used. The gas absorption is 210 atmospheres and the amount of reaction product is 178 parts from which 107 parts of crude butene-(2)-carboxylic acid is recovered.

Example 17

0.5 part of triphenylphosphine, 0.2 part of palladium asbestos (30% of palladium), 100 parts of 1-vinylcyclohexene-(3) and 80 parts of ethanolic hydrochloric acid having an acid number of 50 are placed in an autoclave. After the autoclave has been flushed out with nitrogen, 200 atmospheres of carbon monoxide is forced in and the rotating autoclave is heated to 70° C. Carbon monoxide is forced in up to 300 atmospheres and the pressure and temperature are kept constant for six hours. With a total gas absorption of 20 atmospheres, 204 parts of reaction product is obtained which is shaken up with saturated calcium chloride solution and with sodium carbonate solution. The product is fractionated over an efficient column at 0.15 mm. Hg. Two fractions are obtained:

|  | Fraction 1 | Fraction 2 |
|---|---|---|
| Boiling point at 0.15 mm. Hg, ° C | 55–100 | 100–113 |
| Amount obtained in parts | 113.7 | 30.6 |
| Refractive index $n_D^{20}$ | 1.4594 | 1.4572 |

Fraction 1 consists of a mixture of isomeric monocarboxylic esters $C_8H_{13}COOC_2H_5$ which according to infrared and nuclear magnetic resonance spectra of the bromination product mainly consists of cyclohexenylpropionic ethyl ester.

*Analysis.*—Calculated (percent): C, 72.6; H, 9.9; O, 17.6; hydrogenation iodine No., 140; seponification No., 308. Found (percent): C, 72.7; H, 9.9; O, 17.7; hydrogenation iodine No., 131; saponification No., 316.

Fraction 2 is a mixture of isomers of the dicarboxylic diethyl ester $C_8H_{14}(COOC_2H_5)_2$.

*Analysis.*—Calculated (percent): C, 65.7; H, 9.4; O, 25.0; hydrogenation iodine No., 0; saponification No., 438. Found (percent): C, 66.1; H, 9.5; O, 24.8; hydrogenation iodine No., below 20; saponification No., 432.

When triphenylphosphine is not added, 182 parts of reaction product is obtained from which only 21 parts of monocarboxylic ester fraction can be obtained.

Example 18

A rotating autoclave is charged with 1 part of finely powdered palladium sulfide, 162 parts of cyclododecatriene-(1,5,9), 150 parts by volume of ethanolic hydrogen chloride solution (acid number 50) and 5 parts of triphenylphosphine. The autoclave is flushed with nitrogen, 200 atmospheres of carbon monoxide is forced in, the internal temperature is raised to 80° C. by heating and more carbon monoxide is forced in up to 300 atmospheres for four hours. The autoclave is cooled and released from pressure. 285 parts of reaction product is obtained. When it is distilled in vacuo, 85 parts of cyclododecadiene-(5,9)-carboxylic acid-(1)-ethyl ester is obtained in addition to 87 parts of unreacted cyclododecatriene-(1,5,9). The distillation residue is 21 parts.

Example 19

An autoclave is charged with 162 parts of cyclododecatriene-(1,5,9), 100 parts by volume of ethanolic hydrochloric acid having an acid number of 150, 5 parts of triphenylphosphine and 3 parts of 30% of palladium on asbestos. The autoclave is flushed with nitrogen, 100 atmospheres of carbon monoxide is forced in, and the pressure is raised to 150 atmospheres by forcing in more carbon monoxide as soon as the rotating autoclave has been heated to 90° C. The pressure and temperature are maintained for eight hours. The autoclave is then cooled and released from pressure. 250 parts of reaction product is obtained, which is filtered, freed from excess alcohol by distillation, and distilled in a high vacuum. A total of 205 parts of distillate is obtained, which according to the UR spectrum contains 54% of cyclododecadiene (i.e. 111 parts). The distillation residue is 2 parts.

Example 20

The procedure described in Example 19 is followed but 110 parts by volume of ethanol and 10 parts of concentrated sulfuric acid are used instead of the ethanolic hydrochloric acid. 252 parts of reaction product and 141 parts of a distillate boiling between 60° and 140° C. at 0.1 mm. Hg and containing 22% (i.e. 31 parts) of cyclododecadiene carboxylic acid ethyl ester are obtained. The distillation residue is 24 parts.

Example 21

An autoclave is charged with 180 parts of stearyl alcohol, 0.2 part of 30% of palladium on asbestos, 0.4 part of triphenylphosphine and 5 parts by volume of concentrated aqueous hydrochloric acid. The autoclave is flushed with nitrogen, 100 parts of propylene is forced in, and the pressure is increased to 300 atmospheres by forcing in carbon monoxide. As soon as the rotating autoclave has been heated to an internal temperature of 120° C., more carbon monoxide is forced in up to 700 atmospheres until the pressure remains constant for three hours. A total pressure decrease of 100 atmospheres is observed. 227 parts of reaction product is obtained which is filtered and distilled in a high vacuum. The distillate weighs 200 parts and consists, as is shown by the UR spectrum mainly of isobutyric acid stearyl ester and to a lesser extent of butyric acid stearyl ester.

Example 22

A rotating autoclave is charged with 162 parts of cyclododecatriene, 100 parts by volume of ethanol, 5 parts of triphenylphosphine, 3 parts of 30% of palladium on asbestos and 20 parts of phosphoric acid. The further procedure is the same as that described in Example 19. 151 parts of distillate is obtained which, according to the UR spectrum, contains 7% (i.e. 10.5 parts) of cyclododecadiene carboxylic acid ethyl ester in addition to cyclododecatriene.

Example 23

A rotating autoclave is charged with 162 parts of cyclododecatriene, 120 parts by volume of alcoholic hydrochloric acid having an acid number of 200, 1 part of extremely finely divided palladium oxide and 5 parts of tricyclohexylphosphine. The further procedure is the same as that described in Example 19, except that a reaction pressure of 300 atmospheres is used and the reaction time is four hours. 282 parts of reaction product is obtained from which the ethanol is distilled off at atmospheric pressure. High vacuum distillation of the residue yields 213 parts of distillate which consists of 76% of cyclododecadiene carboxylic acid ethyl ester, 10% of cyclododecene dicarboxylic acid diethyl ester and 14% of unreacted cyclododecatriene.

If the experiment be repeated without adding tricyclohexylphosphine, 263 parts of reaction product is obtained which yields 203 parts of distillate. The latter consists of 68% of monocarboxylic acid ester, 5% of dicarboxylic acid ester and 27% of unreacted cyclododecatriene.

Example 24

The procedure described in Example 21 is followed but phenol is used instead of stearyl alcohol. There is obtained, in addition to unreacted phenol, 40 parts of an ester fraction which, according to the UR spectrum, consists of butyric acid phenyl ester and isobutyric acid phenyl ester.

We claim:
1. In a process for the production of carboxylic acids or carboxylic esters by reacting an exclusively olefinically unsaturated hydrocarbon of 2 to 20 carbon atoms and 1 to 4 olefinic double bonds with carbon monoxide and a hydroxy compound selected from the group consisting of water, alcohols and phenols of up to 20 carbon atoms and from 1 to 2 hydroxy groups, said alcohols and phenols having a hydrocarbon structure apart from said hydroxy groups and being without olefinic or acetylenic double bonds, the improvement of carrying out said reaction at a temperature of from 30° C. to 180° C., under a pressure of 25 to 1000 atmospheres and in the presence of:
  (A) a substance selected from the group consisting of metallic palladium and a palladium chalcogenide,
  (B) an acid having a dissociation constant K greater than $10^{-4}$, and
  (C) a compound selected from the group consisting of organic phosphines and nitriles.

2. A process as claimed in claim 8 wherein component (B) is an acid selected from the group consisting of sulfuric acid, phosphoric acid, perchloric acid, hydrogen chloride, hydrogen bromide and hydrogen iodide.

3. A process as claimed in claim 1 wherein an organic phosphine is used which contains at least one aromatic radical.

4. A process as claimed in claim 1 wherein a triarylphosphine or tricycloalkylphosphine is used which has eighteen to thirty carbon atoms.

5. A process as claimed in claim 1 wherein a trialkylphosphine is used which has three to thirty carbon atoms.

6. A process as claimed in claim 1 wherein a nitrile having two to twenty carbon atoms and one to two nitrile groups which apart from the nitrile groups has hydrocarbon structure.

7. A process as claimed in claim 1, wherein finely divided palladium is used which is deposited on an inert carrier.

8. A process as claimed in claim 1 carried out in the presence of a hydrogen halide as an acid.

References Cited

UNITED STATES PATENTS

| | | | |
|---|---|---|---|
| 2,658,075 | 11/1953 | Reppe et al. | 260—533 |
| 2,739,169 | 3/1956 | Hagemeyer | 260—533 XR |
| 3,119,861 | 1/1964 | Blackham | 260—544 |
| 3,168,553 | 2/1965 | Slaugh | 260—514 XR |

OTHER REFERENCES

Tsuji et al.: Tetrahedron Letters, No. 22, pp. 1437–1440 (1963).

Tsuji et al., J. Am. Chem. Soc., vol. 86, (1964), pp. 4851–4853.

LORRAINE A. WEINBERGER, Primary Examiner

PAUL J. KILLOS, Assistant Examiner

U.S. Cl. X.R.

260—479, 486, 497, 514, 515, 533

PO-1050
(5/69)

UNITED STATES PATENT OFFICE
CERTIFICATE OF CORRECTION

Patent No. 3,501,518        Dated March 17, 1970

Inventor(s) Nikolaus von Kutepow et al

It is certified that error appears in the above-identified patent and that said Letters Patent are hereby corrected as shown below:

Column 2, line 5, "$_mLPdX_n$" should read --$L_mPdX_n$--; line 40, "are" should read --or--; line 54, "dibasicor" should read --dibasic or--

Column 3, line 4, "cyclohexadieneces" should read --cyclohexadienes--; line 43, "aluminue" should read --aluminum--.

Column 5, line 69, "cyclo" should read --cyclo- --.

Column 10, line 1, "seponification" should read --saponification--.

Column 11, line 33, insert --The percentages are determined from the UR spectrum.--.

Column 12, line 10, claim 2, "8" should read -- 1 --.

SIGNED AND
SEALED

AUG 4 - 1970

(SEAL)
Attest:

Edward M. Fletcher, Jr.
Attesting Officer

WILLIAM E. SCHUYLER, JR.
Commissioner of Patents